United States Patent [19]

Przytulla

[11] Patent Number: 4,529,570
[45] Date of Patent: Jul. 16, 1985

[54] PROCESS FOR FABRICATING A HOLLOW BODY

[75] Inventor: Dietmar Przytulla, Sindorf, Fed. Rep. of Germany

[73] Assignee: Mauser-Werke GmbH, Bruhl, Fed. Rep. of Germany

[21] Appl. No.: 491,730

[22] Filed: May 5, 1983

[30] Foreign Application Priority Data

Jul. 17, 1982 [DE] Fed. Rep. of Germany ....... 3226872

[51] Int. Cl.³ ............................................. B29C 17/07
[52] U.S. Cl. .................................... 264/534; 425/525
[58] Field of Search ................. 264/534, 296; 425/525

[56] References Cited

U.S. PATENT DOCUMENTS 4,170,623 10/1979 Dubois et al. .................. 425/525 X
4,228,122 10/1980 Hammes .......................... 425/525 X
4,378,328 3/1983 Przytulla .......................... 425/525 X Primary Examiner—Jan Silbaugh
Attorney, Agent, or Firm—Pennie & Edmonds

[57] ABSTRACT

The method of producing a hollow body from plastic material with an annular protrusion disposed circumferentially around the wall of the body, the method comprising the formation of the protrusion by extruding the protrusion from the wall of the preform after the preform has been made.

3 Claims, 8 Drawing Figures

4,529,570

PROCESS FOR FABRICATING A HOLLOW BODY

BACKGROUND OF THE INVENTION

In fabricating hollow bodies such as, for example, large 55 gallon drums, it has been the practice to extrude a hollow tubular shaped, thermoplastic preform or parison from an extrusion machine into an open blow molding apparatus. The walls of the blow molding apparatus are thereafter closed and air is blown into the preform to cause it to expand and move outwardly against the surrounding walls of the blow molding apparatus. Often in forming such a hollow body it is desirable to provide annular protrusions around the circumference of the wall of the tubular member. These protrusions may be external or internal of the wall of the hollow body. Internal protrusions are suitable where simple reinforcement is desired. Externally disposed protrusions can provide rolling rings for the container or chime members, such as L-shaped chimes, to be used in connection with handling the hollow body.

Where an annular protrusion is to be formed the wall of the molding apparatus is constructed to provide one or more annular recesses into which the plastic material of the preform is blown during the blow molding operation. These annular recesses extend circumferentially around the inner wall surface of the molding apparatus and are defined by a fixed mold surface, facing axially of the preform, and an axially movable slide member. After the blow molding operation is completed the slide member is moved axially into the recess to form the annular protrusion to the desired configuration, the protrusion being formed in the recess and its shape being dictated by the shape of the recess.

If these protrusions are formed from the unreinforced wall material of the preform which has penetrated into the annular recess of the molding apparatus, it may happen that there is not enough of this material to form a proper protrusion with evenly distributed material. This is so because when the preform is blown out into the annular recess, it is stretched and thus thinned out. Then, as the slide member of the molding apparatus is moved axially against the material in the recess, the material is folded and welded while in a still hot formable state. This basic procedure is disclosed in the British Patent Specification No. 882,789. If there is an insufficient supply of material, weak points in the form of notches can be created which increase the risk of tearing in the event of swell pressure due to the toppling of a filled hollow body.

For this reason, the walls of the preform material have been made thicker in the area of the annular protrusion so that, during the subsequent forming process, sufficient upsetting material is available. The increase in wall thickness in the preform at the axial position where the protrusion is to be formed is created by changing the gap cross-section of the extrusion nozzle during the extrusion of the preform. As a result of this procedure, however, the increased thickness extends in a broad band over an axial area of the preform.

Control of the wall thickness by changing the cross-section of the extrusion nozzle is described, among other places, in the British Patent Specification No. 1,493,453 and U.S. Pat. No. 3,275,726. Also, the Journal "Kunststoffe" ("Plastics") of May 1978, page 314 ff, describes and shows, FIG. 1, an L-Ring Barrel of 220 l capacity. FIG. 1 is a sectional view with the measurement values of the thickness distributions axially of the casing. The description explains that the two circumferential, massive L-shaped rolling and lifting hoops have been generated integrally from the preform by means of axial upsetting of the preform. The typical process described above is employed to provide the additional quantity of plastic for forming the outwardly extending protrusion. But, as also described above, control of the extrusion orifice results in a broad-band axial thickening of the preform. A significant disadvantage of this procedure is that more material than necessary must be used for forming the protrusion. This is so because additional material making up the thickened wall normally tends to sag as the preform is extruded and thus shift out of the location where the protrusion is to be formed. This downward migration is due to the weight of the material making up the additional thickness. To overcome this, the thickening is effected over the wide band area.

U.S. Pat. No. 4,170,623 purports to show the formation of an annular thickening only in the immediate area of the annular recess of the blowing mold. This thickened area is, as stated in the patent, formed during the extrusion of the preform in accordance with well-known techniques. According to the drawings of this patent the thickened portion is narrowly restricted axially of the preform and maintained in its alignment with the annular recess in the molding apparatus until it is blown into the recess. Since, however, the thickened wall of the preform is formed during the extrusion of the preform by controlling the nozzle size, the drawings of this patent do not accurately show the true behavior of this thickened portion. As indicated above, a sharply delimited narrow annular thickening in the preform will migrate downwardly from the horizontal plane where it is initially formed during the extrusion process. Also with the thickness of the preform being greater adjacent the mold dividing seams, the downward migration of the thickened area will vary about the circumference of the preform. More particularly, the thickened portion adjacent the mold dividing seams being heavier will move downwardly further than the thickened portion disposed at 90° from the mold dividing seams. Therefore, if the thickened annular portion of the preform penetrates at all into the radial recess of the molding apparatus during blow molding, it does so only in partial regions as measured circumferentially of the preform. Accordingly, no satisfactory ring formation or protrusion is effected.

SUMMARY OF THE PRESENT INVENTION

In accordance with the teachings of the present invention, the necessary excess material required for forming the protrusions on the formed hollow body is collected after the extrusion of the preform. No manipulation of the extrusion orifice is necessary. Instead the wall of the preform is blown into an annular recess in the molding apparatus. As with prior molding apparatus, an axially movable slide member is provided in alignment with the annular recess. However, unlike the prior method of forming a protrusion directly in the recess by moving the slide member axially part way into the recess, the protrusion is formed outside of the recess. More particularly, the slide, in accordance with the method of the present invention, is moved into the annular recess to the extent necessary to extrude the plastic material contained therein out of the recess so as to form the desired protrusion outside of the recess. If the protrusion is desired for simply reinforcing the wall of the hollow body, the annular recess will form a single chamber in the molding apparatus and the protrusion will be formed internally of the hollow body. If, on the other hand, the protrusion is to be formed on the outside of the hollow body, a series connected radially inwardly second annular recess will be provided in the molding apparatus and the material blown into the first recess will be extruded radially inwardly into the second recess where the protrusion will then be formed to the shape of the second recess.

DESCRIPTION OF THE PREFERRED EMBODIMENTS

Figure 2:
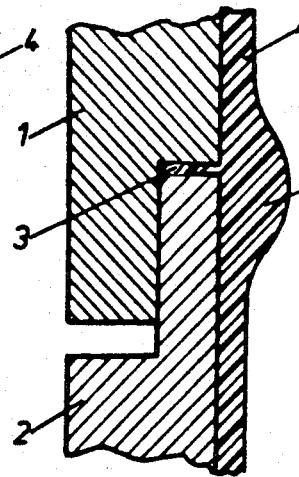
FIG. 2 is a view similar to FIG. 1 showing the formed protrusion on the hollow body after the extrusion of the material from the annular recess.

In the drawings the stationary wall portion of the blow molding apparatus is designated by 1, and the slide member which is movable in the axial direction is designated by 2. An annular recess 3 is defined by the wall surfaces 1' and 1" of the mold part 1 together with the upsetting surface 2' of the slide member 2. When the slide member 2 is open and the tubular preform 4 is blown up, the preform material will penetrate into the recess space 3. When the slide member 2 is moved into its terminal position, essentially fully filling the space 3, this material is first compressed and then extruded into the interior space of the hollow body while the recess space 3 is almost completely emptied. A homogeneous annular protrusion 5 is thereby produced internally of the hollow body (FIG. 2).

The welding of the material in the recess 3 is promoted by a higher compression ratio, and the radially inwardly directed flow of material. Formation of damaging notches as occur with prior forming methods is avoided. In this fashion, the increased thickness of the material is no longer produced by changing the gap of the extrusion nozzle but by an extrusion of the previously formed preform material. Accordingly, it is possible to adhere to a quite precise horizontal position adjustment of the thickened area without being concerned about sagging of the material before it is blown into the annular recess.

Figure 1:
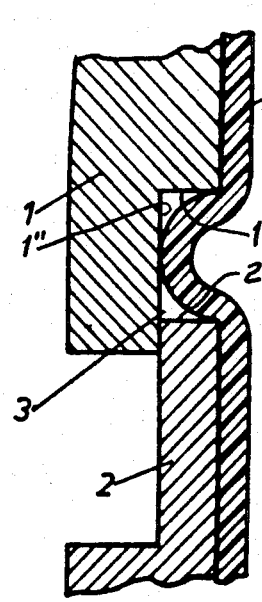
FIG. 1 is a partial cross-sectional view of a molding apparatus showing the preform blown into a single annular recess prior to formation of the protrusion on the hollow body.
Figure 3:
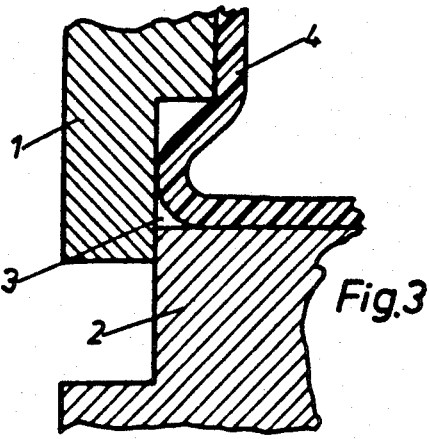
FIG. 3 is a view similar to FIG. 1 showing the formation of the annular recess at the lower end of the hollow body.
Figure 4:
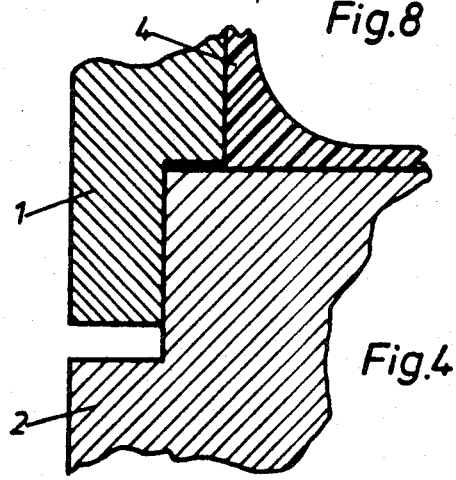
FIG. 4 is a view similar to FIG. 2 showing the formed reinforced corner of the hollow body after complete extrusion of the material from the annular recess.

As shown in FIGS. 3 and 4, a uniform corner reinforcement can be attained in the same manner as described above with respect to FIGS. 1 and 2. Again, the formation of damaging notches is avoided.

Figure 8:
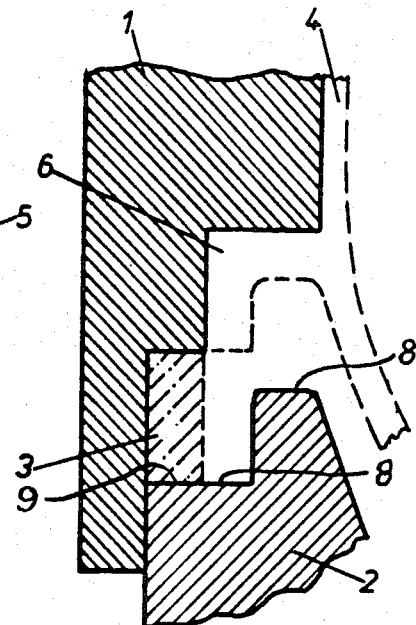
FIG. 8 is a view similar to FIG. 5 showing the molding apparatus with the slide member in its starting position and further showing the two annular recesses and the final formed protrusion configuration in dotted lines.

In the construction shown in FIGS. 5-8 a second annular recess or space 6 is series connected to the recess 3, radially inwardly thereof. For clarity, the volume of the recess 3 has been cross-hatched in FIG. 8 and the profile of the annular protrusion later formed in the annular space 6 is shown in phantom lines. As shown in FIG. 8 and in FIG. 7, this protrusion 7 has an L-shaped cross-section.

Figure 5:
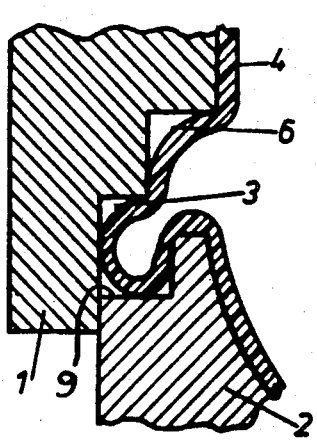
FIG. 5 is a cross-sectional view of a modified embodiment of the invention showing a series connected recess for use in forming an outwardly disposed protrusion on the hollow body.
Figure 6:
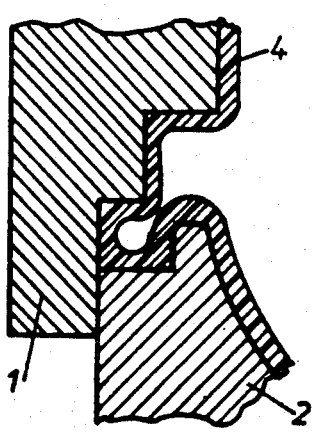
FIG. 6 is a view similar to FIG. 5 with the slide member if the molding apparatus partially moved into its final position.
Figure 7:
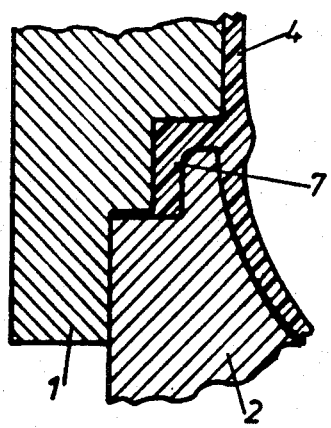
FIG. 7 is a view similar to FIG. 5 showing the slide member in its final position having extruded the plastic material from the outermost annular recess into the innermost annular recess.

In contrast to conventional designs, the upsetting cross-section of the forming slide 2 of the molding apparatus of FIGS. 5-8 has been expanded by an additional upsetting-circular ring-plane surface disposed radially outwardly of the annular space 6. In FIG. 8, the previously employed upsetting-circular ring-plane surfaces are indicated by 8, and the additional upsetting-circular ring-plane surface is indicated by 9. An addition upsetting volume forms in the recess 3. Through the motion of the slide 2, the preform is first compressed in the area of the additional upsetting circular-ring plane surface 9 (FIGS. 5 and 6). As the stroke of the slide increases, the precompressed material is extruded into the axial profile region, namely the annular recess 6 (FIG. 6). At the end of the stroke of the slide 2, nearly the entire volume originally in space 3 has been pressed out and into the recess 6 where it is further compressed into the protrusion.

Through extrusion of the material from the recess 3 into the recess 6, the outer welding fold in the recess 6 is closed. Welding of the material in the recess 6 is favored by a high compression ratio. Furthermore, varying wall thicknesses about the circumference of the preform, as produced by different stretching paths during the blowing process, can be equalized by different chamber depths of the recess space 3 over the circumference. If the slide 2 is moved fully into the space 3, all the material therein is extruded into the profile annular recess 6.

I claim:

1. The method of producing a hollow body from plastic material with at least one annular protrusion disposed circumferentially about the wall of the hollow body wherein the hollow body is blow molded from a tubular preform extruded into a blow molding apparatus, said apparatus having a side wall with an annular recess therein defined by a fixed surface facing axially of the preform and an axially aligned slide member movable axially into said annular recess, the recess receiving hot formable material from the preform during the blow molding thereof, said method comprising the step of:
   (a) moving said slide member axially and fully into said recess to compress the hot formable material therein and extrude essentially all of it out of the recess to form said protrusion.

2. The method according to claim 1 wherein:
   (a) the preform is formed with a generally uniform wall thickness as measured axially thereof.

3. The method according to claim 1 or 2, wherein:
   (a) the annular recess is disposed radially outwardly of a second recess in the side wall of the molding apparatus and is in serial communication therewith;
   (b) the slide member is moved axially fully into the first mentioned recess to compress and extrude essentially all of the material therein into the second recess; and
   (c) the material extruded into said second recess is compressed into said protrusion with a shape corresponding to that of the second recess.

* * * * *